US012382938B2

(12) United States Patent
Akopov et al.

(10) Patent No.: US 12,382,938 B2
(45) Date of Patent: Aug. 12, 2025

(54) SCENT BULLET FISHING TACKLE SCENT AND BAIT RELEASE SYSTEM

(71) Applicants: Michael Akopov, Richland, WA (US); Faith Akopov, Richland, WA (US)

(72) Inventors: Michael Akopov, Richland, WA (US); Faith Akopov, Richland, WA (US)

(73) Assignee: Tri Cities Tackle, LLC, Richland, WA (US)

( * ) Notice: Subject to any disclaimer, the term of this patent is extended or adjusted under 35 U.S.C. 154(b) by 0 days.

(21) Appl. No.: 18/627,872

(22) Filed: Apr. 5, 2024

(65) Prior Publication Data
US 2024/0334918 A1   Oct. 10, 2024

Related U.S. Application Data

(60) Provisional application No. 63/494,345, filed on Apr. 5, 2023.

(51) Int. Cl.
*A01K 85/01* (2006.01)
(52) U.S. Cl.
CPC .................. *A01K 85/018* (2022.02)
(58) Field of Classification Search
CPC ................................................ A01K 85/018
See application file for complete search history.

(56) References Cited

U.S. PATENT DOCUMENTS

| | | | | |
|---|---|---|---|---|
| 2,465,127 A * | 3/1949 | Stark | .............. | A01K 97/02 43/44.99 |
| 4,602,453 A * | 7/1986 | Polley | .............. | A01K 91/00 43/44.99 |
| 4,964,235 A * | 10/1990 | Gruelle | .............. | A01K 85/01 43/42.06 |
| 5,321,906 A * | 6/1994 | Bommarito | .............. | A01K 85/01 43/44.99 |
| 7,448,159 B2 | 11/2008 | Berg | | |
| 7,490,432 B2 | 2/2009 | Gillihan | | |
| 7,520,086 B2 * | 4/2009 | Melhorn | .............. | A01K 97/02 43/44.99 |
| 8,474,174 B2 | 7/2013 | Norman | | |
| 11,612,152 B1 * | 3/2023 | Price | .............. | A01K 83/06 43/41 |

(Continued)

FOREIGN PATENT DOCUMENTS

| | | | | |
|---|---|---|---|---|
| CA | 2450180 C * | 9/2006 | .............. | A01K 85/01 |
| KR | 20130001092 A * | 5/2013 | | |
| WO | WO-9801028 A1 * | 1/1998 | .............. | A01K 97/02 |

*Primary Examiner* — Christopher P Ellis
(74) *Attorney, Agent, or Firm* — Gravis Law, PLLC; Stephen S. Zimowski

(57) ABSTRACT

Described herein is a small and lightweight terminal tackle product with upper and lower sections slidably connectable to one another. Each of the upper and lower sections is provided with a scent chamber open on one end to provide for the introduction of scent attractant material. The upper and lower sections are provided with male and female connection features to hold them together while the product is submerged during use and allow them to be conveniently disconnected to refill with scent attractant material without significant disruption. The present invention features apertures for threading fishing line and for releasing the scent attractant material into the ambient underwater environment when in use.

20 Claims, 9 Drawing Sheets

(56) References Cited

U.S. PATENT DOCUMENTS

| | | | |
|---|---|---|---|
| 2002/0050089 A1* | 5/2002 | Dixon | A01K 85/01 |
| | | | 43/42.19 |
| 2003/0075613 A1* | 4/2003 | Brown | A01M 1/2055 |
| | | | 239/57 |
| 2003/0126785 A1* | 7/2003 | Poinski | A01K 85/01 |
| | | | 43/42.06 |
| 2006/0005456 A1* | 1/2006 | Harris | A01K 91/06 |
| | | | 43/42.06 |
| 2018/0132461 A1* | 5/2018 | Caldeira | A01K 85/128 |
| 2019/0014761 A1* | 1/2019 | Rosher | A01K 85/18 |
| 2022/0095600 A1 | 3/2022 | Gillihan | |
| 2022/0264856 A1* | 8/2022 | Malooley | A01K 83/06 |
| 2023/0210098 A1* | 7/2023 | Phillips | A01K 85/018 |
| | | | 43/42.06 |
| 2024/0324564 A1* | 10/2024 | Levy | A01K 85/1847 |
| 2024/0365763 A1* | 11/2024 | Goehler | A01K 85/018 |

* cited by examiner

SCENT BULLET FISHING TACKLE SCENT AND BAIT RELEASE SYSTEM

FIELD OF THE INVENTION

The present invention relates to tackle for commercial and leisure angling that facilitates the sustained release of bait and/or scent while the fishing line is in the water. Specifically, the present invention provides terminal tackle for releasing scent attractant material into the immediate environment to encourage fish to strike when fishing using live bait, lures, or other artificial bait.

BACKGROUND OF THE INVENTION

Fishing takes many forms in many contexts, from rod-and-real angling to bailing, chumming, or chunking to fly fishing to trolling and drifting. Fishing can be done from a dock, boat, or land, and is a favorite leisure activity for millions worldwide, not to mention commercial fishing activities. One of the most popular forms of fishing is rod-and-real angling, which refers to the use of bait attached to a rod-and-real fishing apparatus using fishing line. The angler casts the line into the water or drops it over the edge of the boat or dock, waiting for a fish to strike the line.

The tackle used in rod-and-real angling can take many forms and includes various features, but generally includes the fishing rod, the real, the line, and the hook designed and arranged to catch a striking fish. Other items are often used as well, including swivels, crimps, weights, sinkers, bobbers, leaders, lures, and bait. Many of these additional items typically reside at or near the end of the line attached to the hook and are accordingly commonly referred to as terminal tackle.

Any fisherman who has ever engaged in chumming or chunking can attest that certain scents attract fish for feeding. Fish use their sense of smell to find food and avoid predators, among other things, particularly in low visibility underwater environments. Indeed, for most fish, sense of smell is their primary way of finding prey, and some information suggests a fish's sense of smell is more than 1,000 times better than that of a human. So the use of a scent trail or scent track is highly effective at attracting fish.

The best scents at attracting fish are those that occur naturally in the fish's natural, underwater environment. Many fish by-products or products intended to mimic the smell of underwater wildlife operates effectively as an attractant. Other attractant scents include salt and potentially even coffee and garlic. Many anglers will simply rub such scents on their bait of choice, particularly when using artificial lures and the like. However, this approach requires regular reapplication, as the scent product tends to dissipate quickly in the water. And applying a substantial amount of scent producing product simply by rubbing it on the outside of an artificial lure is not generally feasible or effective.

Accordingly, the need arises for a terminal tackle product designed to release fish-attractant scent in and around the immediate environment of the angler's bait. Several products have been designed with this need in mind, often providing bait products with chambers for storing scent attractant materials. For example, U.S. Pat. No. 7,448,159 describes an artificial lure with a hollow portion for introducing a scent attractant material while U.S. Pat. No. 7,490,432 describes a bait bag fixed to a hook with a zipper for adding scent attractant materials. These products suffer from significant drawbacks, however, in that they are limited in their application, may not be usable alongside an anger's favorite lure or other bait, live or artificial, are subject to loss in connection with the loss of bait, and are inconvenient to load and apply or remove to the line.

Another exemplary scent attractant product is the subject of U.S. Pat. No. 8,474,174. It too suffers many of the same drawbacks, however. It is intended to replace an artificial lure, rather than work in conjunction with one, and attach directly or immediately adjacent to a hook, subjecting it to loss whenever other portions of the terminal tackle are lost. It is also limited in its application and inconvenient to load, and the fishing line itself does not contact the scent attractant product, making it more likely that additional repellant scents, such as human skin oils, bug spray, and other repellants are present after being transmitted from the angler's hands to the line.

Accordingly, there remains a substantial need in the fishing industry for a terminal tackle product usable with other terminal tackle features that operate to increase the likelihood of a strike by introducing scent attractant material in the immediate vicinity of the angler's chosen bait. Such a product should be easy to load with scent attractant material, should be interchangeable with various bait products, should be protected from loss along with other terminal tackle items, and should assist in covering the presence of scent repellant on other terminal tackle items.

SUMMARY OF THE INVENTION

It is accordingly an object of the present invention to provide a terminal tackle product that is lightweight and attachable to a leader, fishing line, or other terminal tackle items. The product should be capable of use in conjunction with an angler's favorite lure or other bait and be flexible in where on the line it will reside during use, whether directly adjacent to the bait or further up the line. The product should also be easily loadable and separable from other terminal tackle items such that it is less likely to be lost if such other items, such as hook and/or bait, are lost during fishing. And the product should provide a manner of introducing and dispersing scent attractant material both to attract fish and to mask the presence of any scent repellants on or around the bait.

To accomplish these and other objectives, the present invention provides a small and lightweight terminal tackle product with upper and lower sections slidably connectable to one another. Each of the upper and lower sections is provided with a scent chamber open on one end to provide for the introduction of scent attractant material. The open ends of the upper and lower sections is each preferably adjacent to the other such that, when the sections are connected to one another, a single, enclosed chamber is created.

Each of the upper and lower sections is also provided with a line-feed aperture, preferably located at or near the center of the enclosed end opposite the section's open end, through which the fishing line or leader may be threaded when the present invention is in use. The line or leader is preferably threaded through the line-feed aperture of the upper section, through the scent chamber of the upper section, into and through the scent chamber of the lower section, and through the line-feed aperture of the lower section. The present invention is thus preferably slidable and position-able along the line—for example, the present invention may be positioned directly adjacent to the bait or further up the line using other tackle features, such as sinkers and the like—and scent attractant material within the scent chamber is introduced to the line as the present invention is moved along the line. The present invention is also generally and preferably free to rotate about the line to spread the scent attractant material.

Each of the upper and lower sections is also preferably provided with one or more additional release apertures that allow some amount of the scent attractant material to be released into the surrounding environment when the present invention is submerged during use. The one or more release apertures may be provided in an array around the location of the line-feed aperture or elsewhere on each of the upper and lower sections. The one or more release apertures are preferably arrayed concentrically around the longitudinal circumference of each of the upper and lower sections, although other available arrangements and their particular advantages will be clear to those of skill in the art.

Preferable embodiments of the present invention are substantially cylindrical in shape, with a circular longitudinal cross-section, although other shapes and arrangements are also available without negatively impacting on the present invention's objectives. The upper section is preferably tapered from the open end to a point at the opposite, enclosed end, providing for effective dynamics when the present invention is in use and attached to fishing line traveling through the water. The line-feed aperture of the upper section is preferably positioned at or near the point at the enclosed end, and the release apertures may be arrayed concentrically therearound and/or further along the length of the upper section.

Preferably disposed at the open end of the upper section is a male connection apparatus that provides for connection to a female connection apparatus provided at the open end of the lower section. The male and female connection apparatuses may be connected using known means, although they are preferably slidably connectable and removeable. Accordingly, preferable embodiments of one of the male and female connection apparatuses has a raised ridge which, when connected together, is introduced into and fits within a trench built into the other. The female connection apparatus also preferably includes one or more cut-outs that permit it to expand when the male connection apparatus is introduced therein, facilitating insertion and removal and the operation of the ridge and trench features. Those of skill in the art will recognize the particular features and advantages of this style of slidable connection.

The transition portion of the upper section connecting the male connection apparatus to the remainder of the upper section is preferably tapered as is the leading edge of the female connection apparatus of the lower section, such that, when connected, the upper and lower sections form a more enclosed scent chamber. The female connection apparatus, preferably located at the open end of the lower section, also preferably includes one or more expansion slots, which are designed to facilitate the expansion of the female connection apparatus and/or the open end of the lower section during introduction of the male connection apparatus. Once the raised ridge provided on one of the male or female connection apparatuses reaches the trench provided in the other, the female connection apparatus returns to its pre-insertion size, facilitating the slidable connection between upper and lower sections.

The lower section, like the upper section, is preferably substantially cylindrical and may be tapered to a point or to a flat or rounded enclosed end opposite the open end, where the female connection apparatus is located. The feed-line aperture of the lower section is preferably located at the point, apex, or center of the enclosed end of the lower section. And like the upper section's release apertures, those of the lower section are also preferably arrayed concentrically around the longitudinal circumference of the lower section and may be located adjacent to the lower section's line-feed aperture and/or elsewhere along the length of the lower section where it is curved, tapered, or entirely cylindrical.

To use the present invention, the user preferably introduces it to the leader line or fishing line when baiting and tackling the fishing rod or pole. The leader line or fishing line is fed through the line-feed apertures of each of the upper and lower sections and through the scent chamber formed by both. Once the remaining tackle is added to the line, including hook, bait, sinkers, bobber, etc., the user can separate the upper and lower sections of the present invention and add scent attractant material thereto. The user then slides the upper and lower sections back together, creating the slidable connection to form the scent chamber. The present invention may then be slid along the leader line and/or fishing line as the user sees fit to add scent to the line, and the line may then be cast into the water, wherein the scent attractant material will begin to blead from the present invention's scent chamber out through the release apertures and into the ambient environment around the bait, attracting fish.

As those skilled in the art will appreciate, the present invention is not limited to the embodiments and arrangements described above. Other objects of the present invention and its particular features and advantages will become more apparent from consideration of the following drawings and detailed description of the invention.

DETAILED DESCRIPTION OF THE INVENTION

The following detailed description illustrates the present invention by way of example, not by way of limitation of the principles of the invention. This description will enable one skilled in the art to make and use the invention and describes several embodiments, adaptations, variations, alternatives and uses of the invention, including what is presently believed to be the best mode of carrying out the invention. One skilled in the art will recognize alternative variations and arrangements, and the present invention is not limited to those embodiments described hereafter.

The Scent Bullet terminal tackle product disclosed herein is a novel application of the present invention. Separable and connectable simply by sliding upper and lower sections along the leader line or fishing line to which the Scent Bullet is attached, a user can rapidly refill with scent attractant material and immediately continue fishing. The Scent Bullet terminal tackle product is also a standalone item that can be used alongside an angler's favorite live or artificial bait along with various other terminal tackle items. The Scent Bullet will not get in the way or interfere with the use of other items and is usable to mask deterrent scents, introduce attractant scents and materials, and improve the angler's experience and results on the water.

Figure 1:
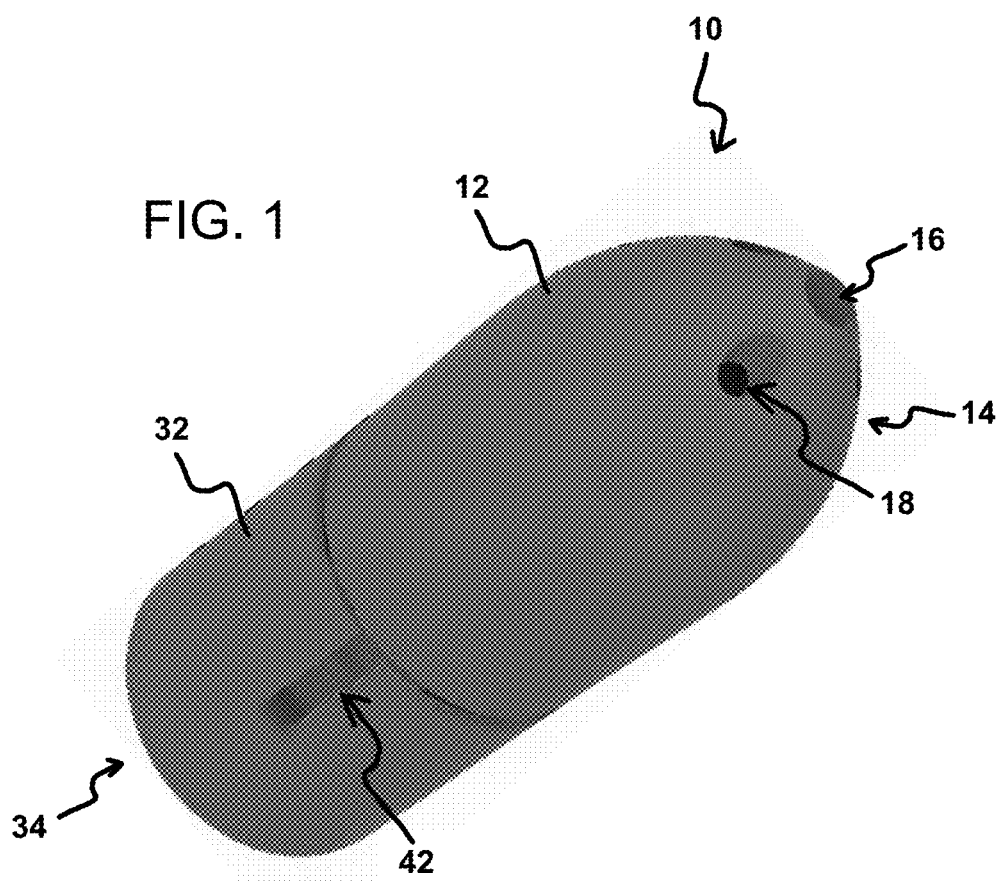
FIG. 1 depicts a perspective view angled from the front of a Scent Bullet terminal tackle product according to preferable embodiments of the present invention.

Referring first to FIG. 1, an exemplary embodiment of a Scent Bullet terminal tackle product 10 according to the present invention's teachings is visible in perspective view. The upper section 12 is connected to the lower section 32, as depicted, and the leader line or fishing line may be introduced through the depicted feed-line aperture 16 in the enclosed end 14 of the upper section 12, through the scent chamber 50 formed by the hollow upper and lower sections 12, 32, and out through a feed-line aperture 36 located in the bottom 34 of the lower section 32 (not depicted in FIG. 1). The one or more release apertures 18 on the upper section 12 are depicted arrayed circumferentially around the feed-line aperture 16. Similar release apertures 38 are present on the bottom section 32 in similar arrangement, although not visible in FIG. 1.

The fishing line or leader line traveling through the scent chamber 50 provides for application of scent attractant material to the line during use. Also depicted in FIG. 1 are the one or more expansion slots 42 that are used to facilitate the slidable connection between upper and lower sections 12, 32. The expansion slots 42 provide flexibility to the female connection apparatus 44, which may be located at the open end 20, 40 of either of the upper or lower sections 12, 32. In FIG. 1, the expansion slots 42 and associated female connection apparatus 44 is located at the open end 40 of the lower section 32, and the male connection apparatus 22 is provided at the open end 20 of the upper section 12. As those of skill in the art will recognize, this arrangement may be reversed, with the male connection apparatus 22 provided on the lower section 32 and the female connection apparatus 44 provided on the upper section 12, without affecting the utility or applications of the present invention.

Figure 2A:
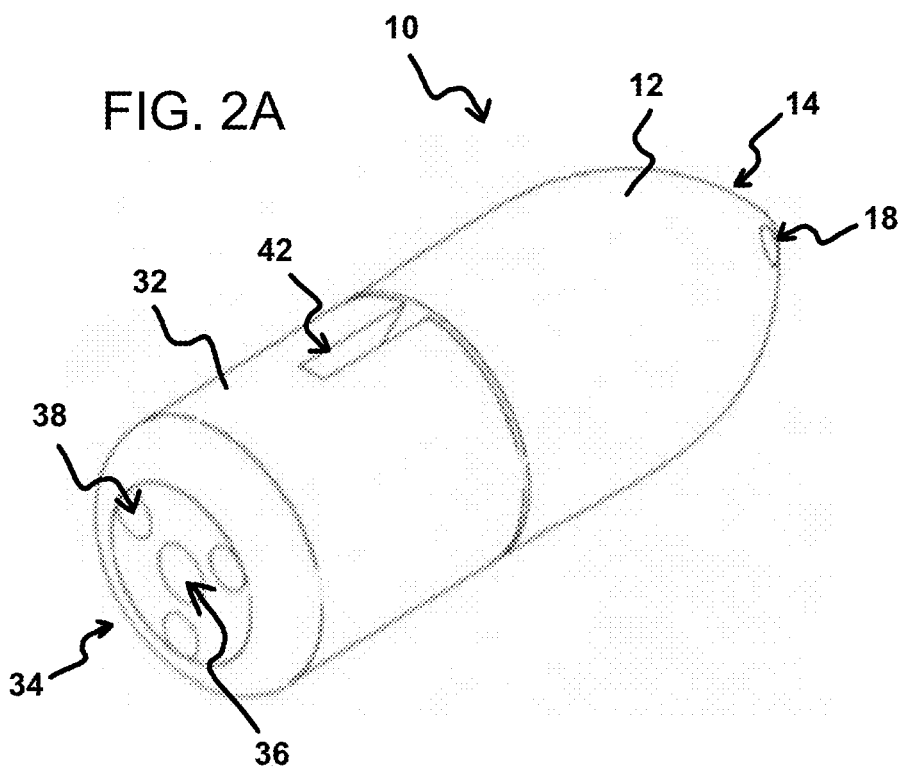
FIG. 2A depicts a perspective view angled from behind a Scent Bullet terminal tackle product according to the preferable embodiments of the present invention depicted in FIG. 1.
Figure 2B:
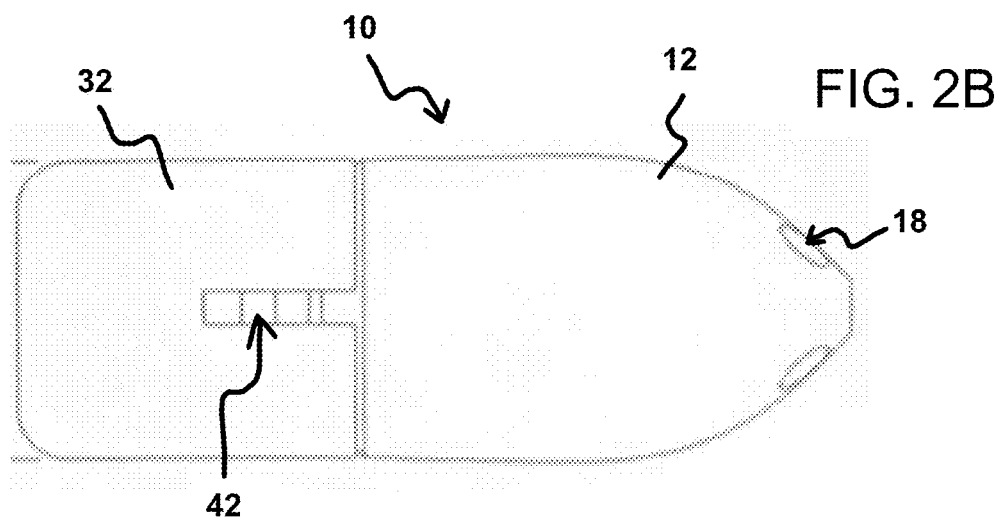
FIG. 2B depicts an orthogonal view from a side of a Scent Bullet terminal tackle product according to the preferable embodiments of the present invention depicted in FIGS. 1 and 2A.
Figure 3A:
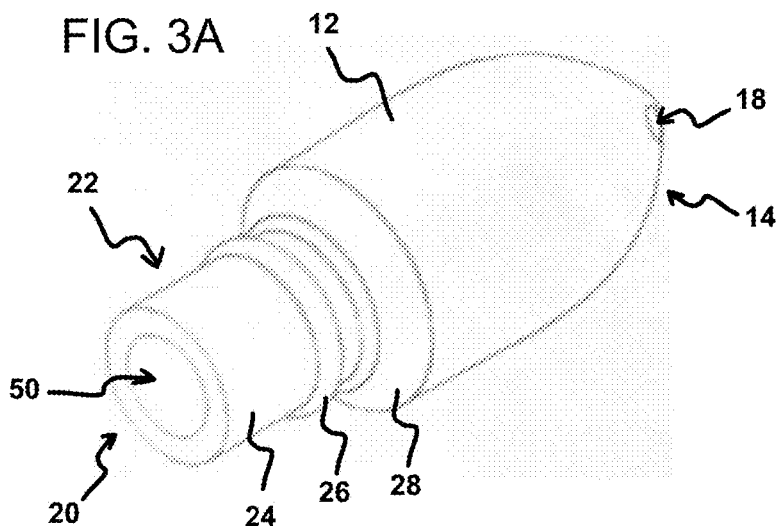
FIG. 3A depicts a perspective view angled from behind an upper section of a Scent Bullet terminal tackle product according to the preferable embodiments of the present invention depicted in FIGS. 1-2.
Figure 3B:
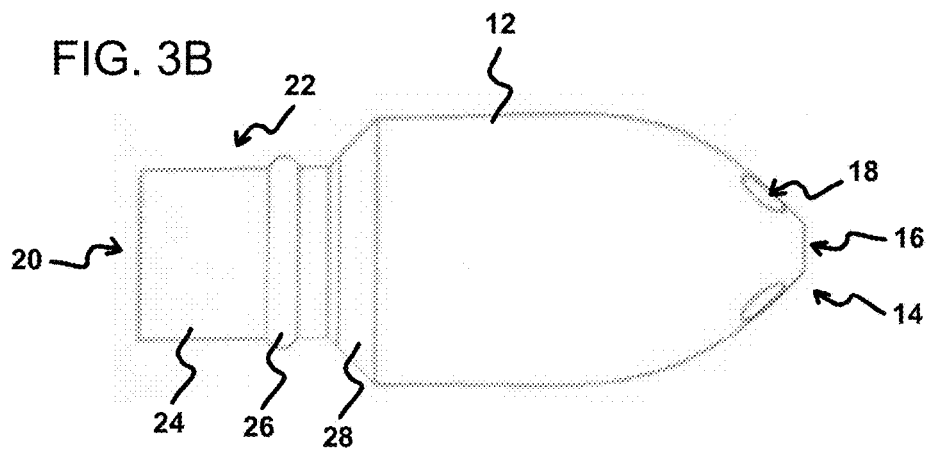
FIG. 3B depicts an orthogonal view from a side of an upper section of a Scent Bullet terminal tackle product according to the preferable embodiments of the present invention depicted in FIGS. 1-2 and 3A.
Figure 3C:
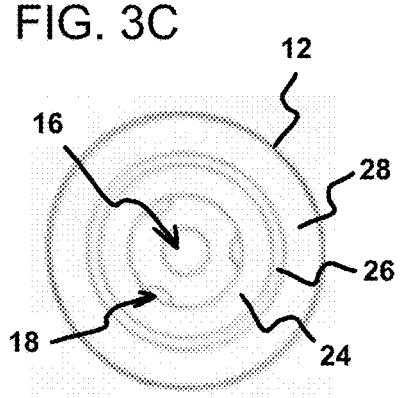
FIG. 3C depicts an orthogonal view from behind an upper section of a Scent Bullet terminal tackle product according to the preferable embodiments of the present invention depicted in FIGS. 1-2 and 3A-B.
Figure 3D:
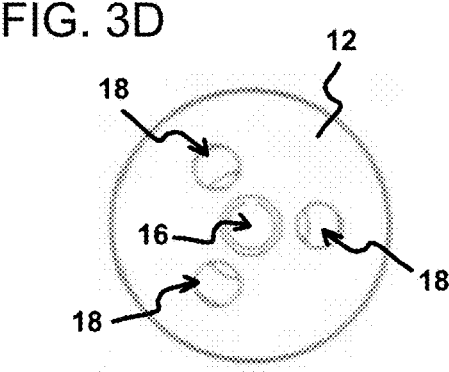
FIG. 3D depicts an orthogonal view from the front of an upper section of a Scent Bullet terminal tackle product according to the preferable embodiments of the present invention depicted in FIGS. 1-2 and 3A-C.

Referring next to FIGS. 2A-B, the enclosed end 34 of the lower section 32 is depicted, with its attendant feed-line aperture 36 and the array of release apertures 38 arrayed circumferentially therearound, is visible from the perspective view from below. While other arrangements and placements for the release apertures 18, 38 is possible, in addition to or instead of the arrangement depicted in FIGS. 1-2, by placing release apertures 18, 38 near the feed-line apertures 16, 36, the flow of water through the present invention is improved as is the release of scent attractant material during use. FIG. 2B particularly shows the tapered nature of both the upper and lower sections 12, 32, which provide aerodynamics to the Scent Bullet terminal tackle product's 10 design and improves its performance and function in the water.

Referring now to FIGS. 3A-D, the upper section 12 of the present invention is depicted separate and apart from the lower section 32, which is not depicted in FIG. 3. The upper section's feed-line aperture 16 and release apertures 18 are visible in the various views depicted in FIG. 3. Likewise, the male connection apparatus 22, present at the open end 20 of the upper section 12 in the preferable embodiment depicted in FIG. 3, is shown in additional detail, particularly in FIGS. 3A-B.

The male connection apparatus 22 preferably substantially matches the longitudinal shape of the upper section 12—a cylinder in the embodiment depicted in FIG. 3—and preferably includes an extended portion 24 extending from the open end 20 of the upper section 12. A raised ridge 26 is preferably provided around the external surface of the male connection apparatus 22 at a location along the extended portion 24. The location of the raised ridge 26 is variable but coincides with the trench 46 provided in the female connection apparatus 44 such that, when the ridge 26 reaches the trench 46, a reasonably tight fit is created between the upper and lower sections 12, 32 of the present invention, facilitating the slidable connection between the two sections.

The transition between the extended portion 24 of the male connection apparatus 22 and the remainder of the upper section 12 is preferably slanted at an angle relative to the length of the upper section 12 and male connection apparatus 22, creating a transition shelf 28 to which the connection surface 48 of the female connection apparatus 44 is preferably designed to match. As depicted in FIG. 3, the maximum diameter of the upper section 12 is larger than the maximum diameter of the male connection apparatus 22 such that, when the upper and lower sections 12, 32 are connected to one another, they form a relatively smooth outer surface for the termination tackle product 10 of the present invention, as depicted in FIGS. 1-2.

Figure 4A:
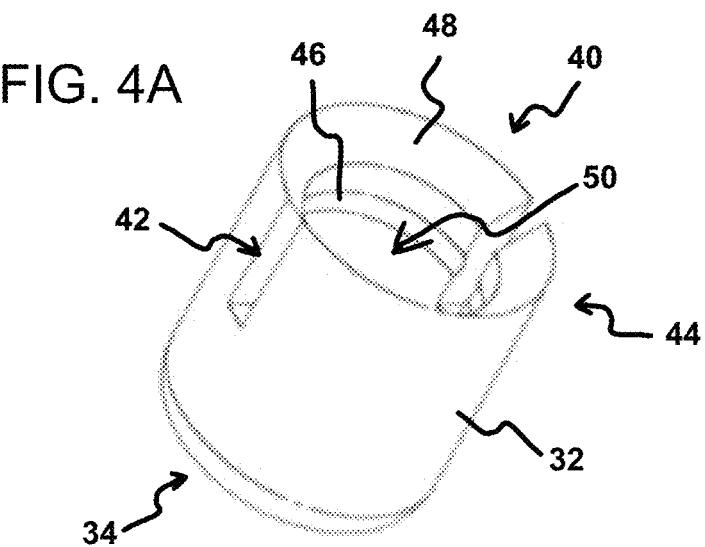
FIG. 4A depicts a perspective view angled from the front of a lower section of a Scent Bullet terminal tackle product according to the preferable embodiments of the present invention depicted in FIGS. 1-3.
Figure 4B:
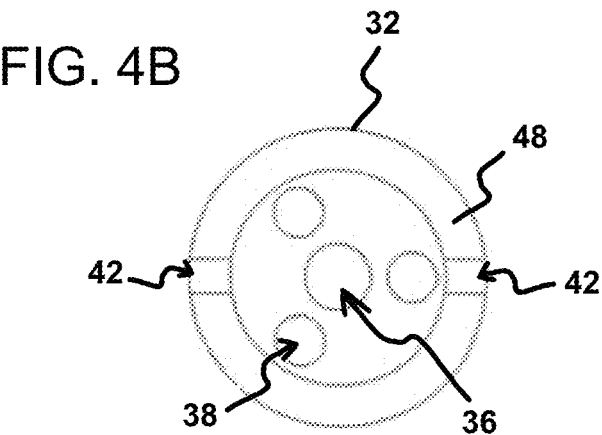
FIG. 4B depicts an orthogonal view from the front of a lower section of a Scent Bullet terminal tackle product according to the preferable embodiments of the present invention depicted in FIGS. 1-3 and 4A.
Figure 4C:
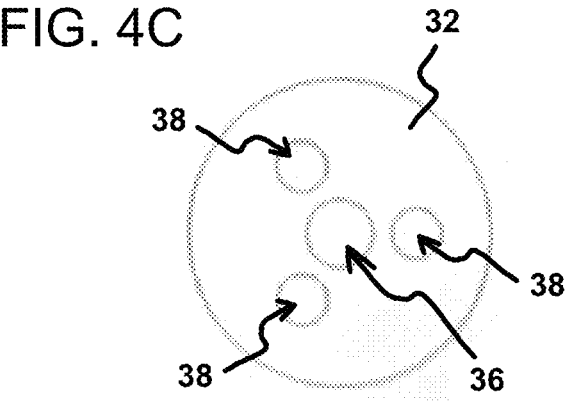
FIG. 4C depicts an orthogonal view from behind a lower section of a Scent Bullet terminal tackle product according to the preferable embodiments of the present invention depicted in FIGS. 1-3 and 4A-B.

The lower section 32 of the present invention is depicted in FIGS. 4A-C. As depicted, the open end 40 of the lower section 32 includes the female connection apparatus 44, including the trench 46 along the inner surface, sized and located to receive the raised ridge 26 of the male connection apparatus 22. Also depicted, specifically in FIGS. 4A and 4B, are the one or more expansion slots 42, which facilitate the insertion and removal of the male connection apparatus 22 from the female connection apparatus 44 by enabling the walls of the lower section 32 to expand when the male connection apparatus 22 is introduced and removed and to retract once the male connection apparatus 22 is fully removed or once its raised ridge 26 reaches and enters the trench 46 of the female connection apparatus 44.

Also specifically depicted in FIGS. 4B and 4C are the feed-line aperture 36 and the one or more release apertures 38 arrayed thereabout on the enclosed end 34 of the lower section 32. As noted, the arrangement depicted in FIG. 4 for the release apertures 38 is preferable, but release apertures 38 may alternatively or additionally be placed elsewhere on the lower section 32 to facilitate the release of scent attractant material when the Scent Bullet terminal tackle product 10 of the present invention is in use.

Preferable embodiments of the present invention are available in various sizes without straying from these teachings. However, the Scent Bullet terminal tackle product 10 according to the present invention has a length from end to end preferably between around ½ an inch and 1½ inches, and more preferably between around 1 inch and 1½ inches, and even more preferably between around 1 inch and 1¼ inches. For preferable embodiments that are substantially cylindrical, the Scent Bullet terminal tackle product 10 according to the present invention has a maximum cross-sectional diameter preferably between around ¼ of an inch and ¾ of an inch, and more preferably between around ¼ of an inch and ⅝ of an inch, and even more preferably between around ⅜ of an inch and ½ an inch. And such preferable embodiments that are substantially cylindrical employ a male connection apparatus 22 with a maximum cross-sectional diameter preferably between around ⅛ of an inch and ⅝ of an inch, and more preferably between around ¼ of an inch and ½ of an inch, and even more preferably between around ¼ of an inch and ⅜ of an inch. Those of skill in the art will understand that, for embodiments of the present invention that are not substantially cylindrical, the maximum cross-sectional diameter measurements disclosed in this paragraph may be replaced by maximum cross-sectional length/width measurements, as appropriate.

Figure 5A:
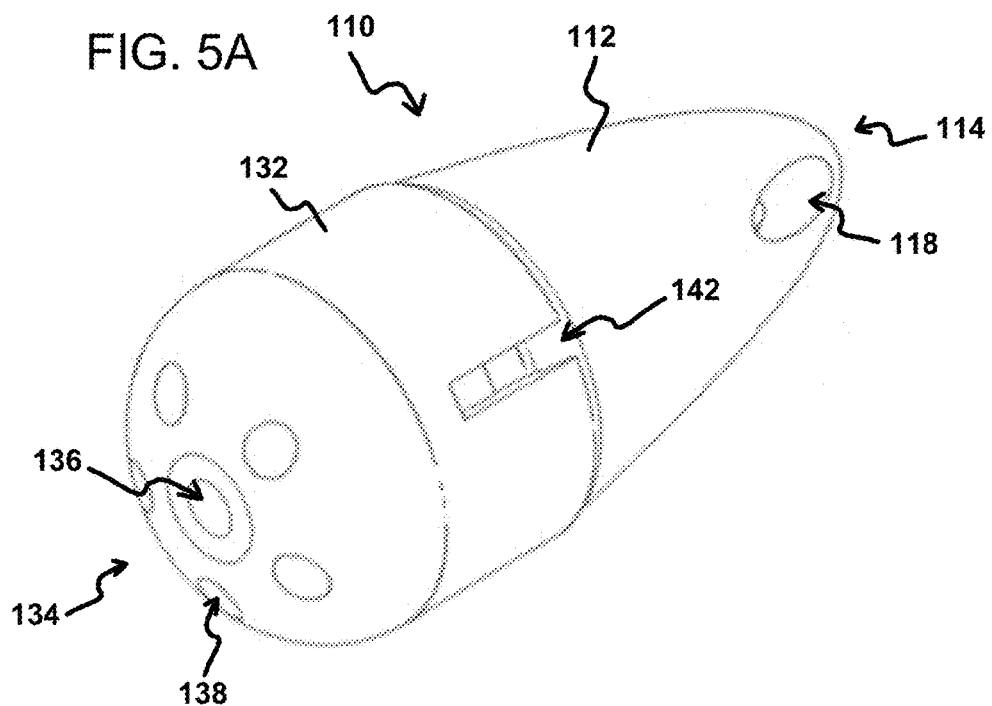
FIG. 5A depicts a perspective view angled from behind a Scent Bullet terminal tackle product according to the preferable embodiments of the present invention depicted in FIGS. 1-4.
Figure 5B:
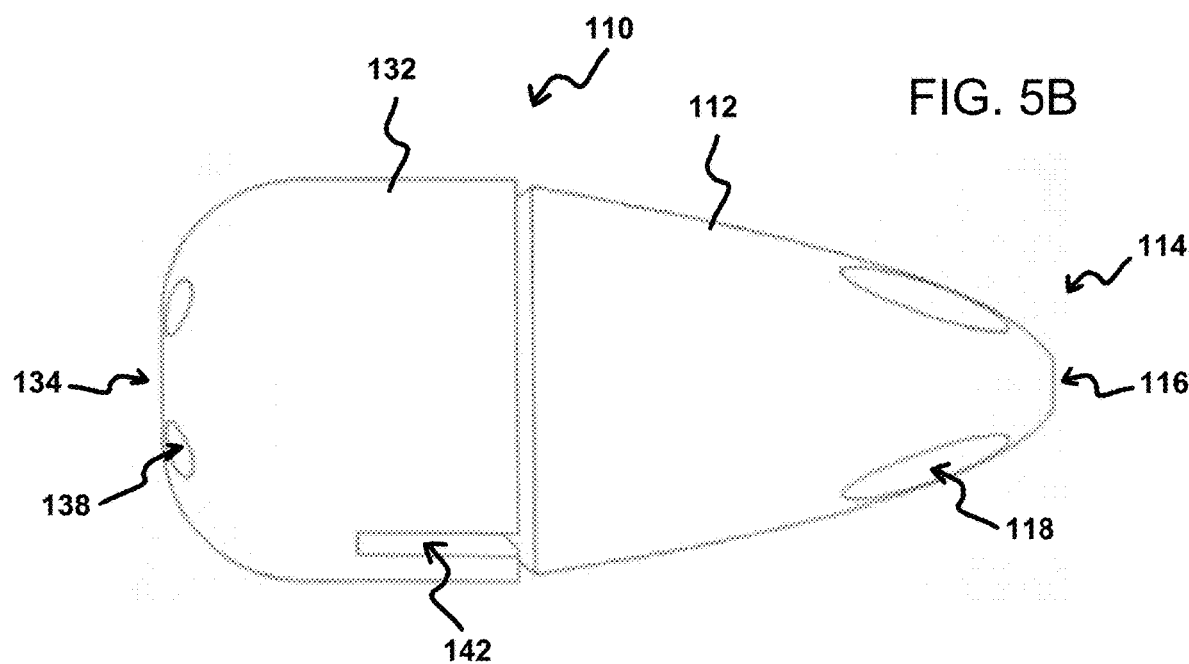
FIG. 5B depicts an orthogonal view from a side of a Scent Bullet terminal tackle product according to the preferable embodiments of the present invention depicted in FIGS. 1-4 and 5A.

Referring now to FIGS. 5A-B, the Scent Bullet terminal tackle product 110 according to preferable embodiments of the present invention is visible from an angle depicting the bottom 134 of the lower section 132 as well as directly from a side. As depicted, the upper section 112 is tapered continually from the enclosed end 114, where the feed-line aperture 116 resides, to the transition shelf 128 connecting the male connection apparatus 122 to the remainder of the upper section 112. The one or more release apertures 118 of the upper section are arrayed around and adjacent to the feed-line aperture 116. Likewise with respect to the feed-line aperture 136 and release apertures 138 of the lower section, which includes 5 release apertures 138 in the preferable embodiment depicted in FIG. 5A. The upper and lower sections 112, 132 are connected in FIG. 5, with the male connection apparatus 122 fully inserted within the female connection apparatus 144. The expansion slots 142 associated with the female connection apparatus are also visible in FIG. 5.

Figure 6A:
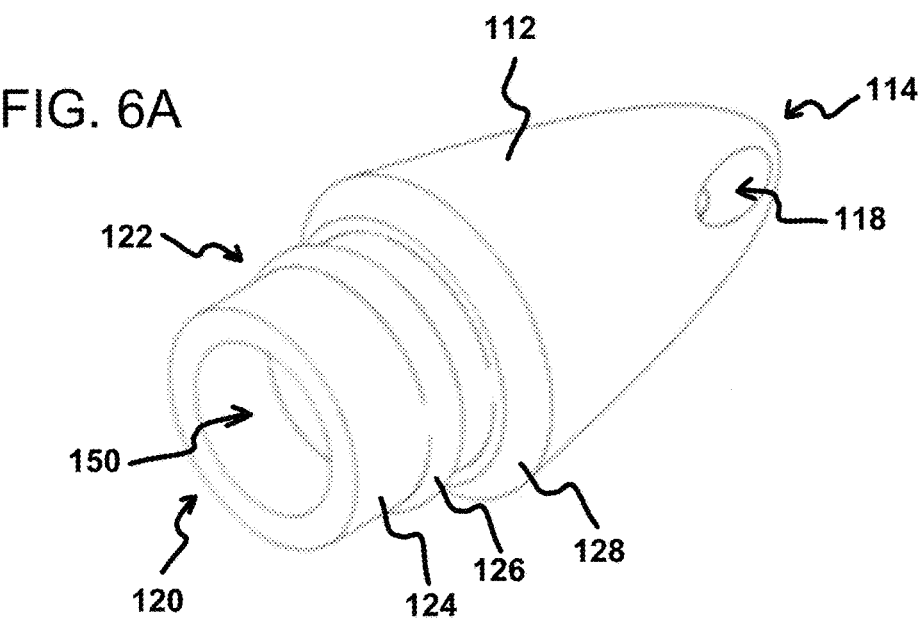
FIG. 6A depicts a perspective view angled from behind an upper section of a Scent Bullet terminal tackle product according to the preferable embodiments of the present invention depicted in FIGS. 1-5.
Figure 6B:
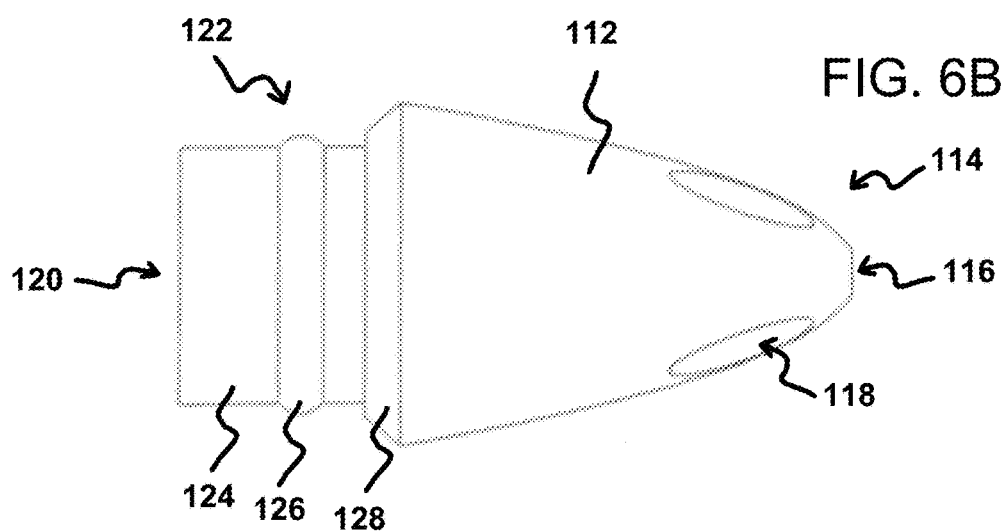
FIG. 6B depicts an orthogonal view from a side of an upper section of a Scent Bullet terminal tackle product according to the preferable embodiments of the present invention depicted in FIGS. 1-5 and 6A.
Figure 6C:
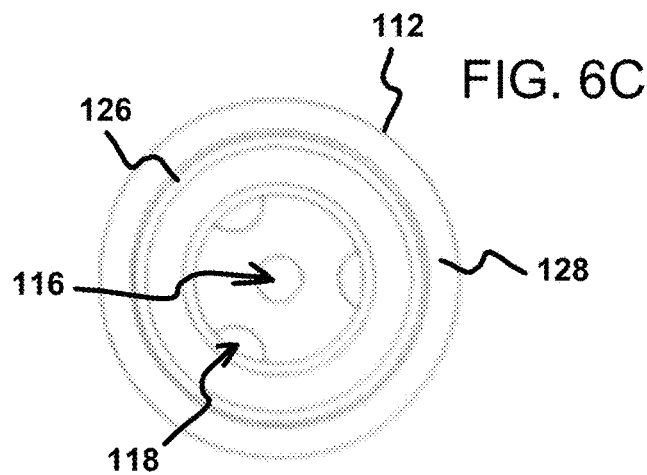
FIG. 6C depicts an orthogonal view from behind an upper section of a Scent Bullet terminal tackle product according to the preferable embodiments of the present invention depicted in FIGS. 1-5 and 6A-B.

FIGS. 6A-C depict the upper section 112 separated from the lower section 132, which is not shown in FIG. 6. The features of the male connection apparatus 122 and transition shelf 128 of the upper portion 112 are made visible, particularly in FIGS. 6A and 6B. The extension portion 124 and raised ridge 126, which are inserted into and connect with the female connection portion 144 of the lower section 132, can be seen, as can the open end 120 of the male connection apparatus 122, which provides for insertion of scent attractant material within the scent chamber 150 of the upper section.

Figure 7A:
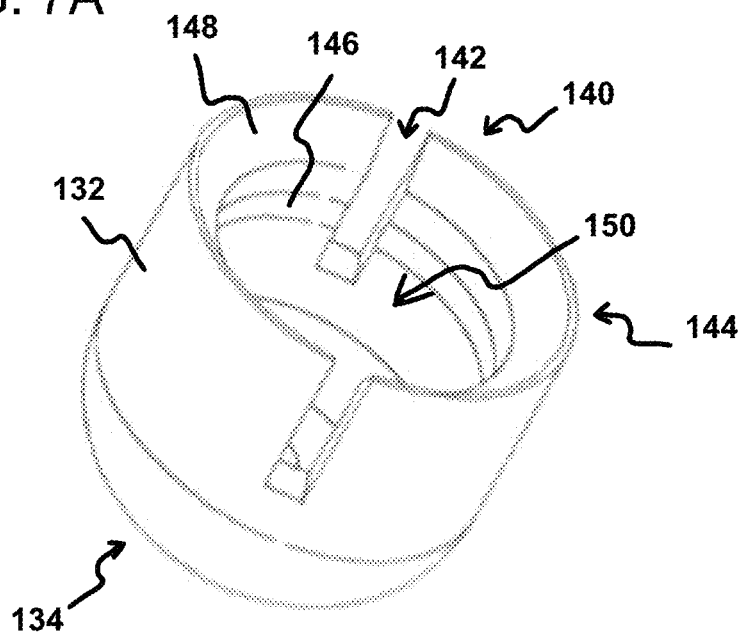
FIG. 7A depicts a perspective view angled from the front of a lower section of a Scent Bullet terminal tackle product according to the preferable embodiments of the present invention depicted in FIGS. 1-6.
Figure 7B:
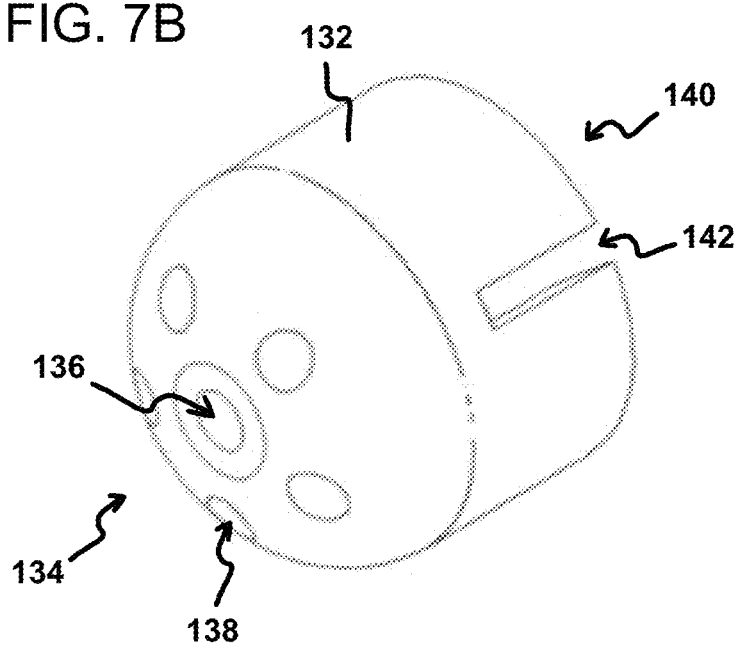
FIG. 7B depicts a perspective view angled from behind a lower section of a Scent Bullet terminal tackle product according to the preferable embodiments of the present invention depicted in FIGS. 1-6 and 7A.
Figure 7C:
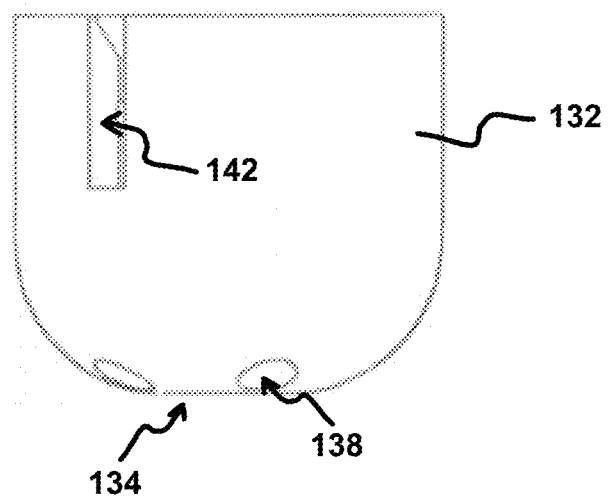
FIG. 7C depicts an orthogonal view from a side of a lower section of a Scent Bullet terminal tackle product according to the preferable embodiments of the present invention depicted in FIGS. 1-6 and 7A-B.
Figure 7D:
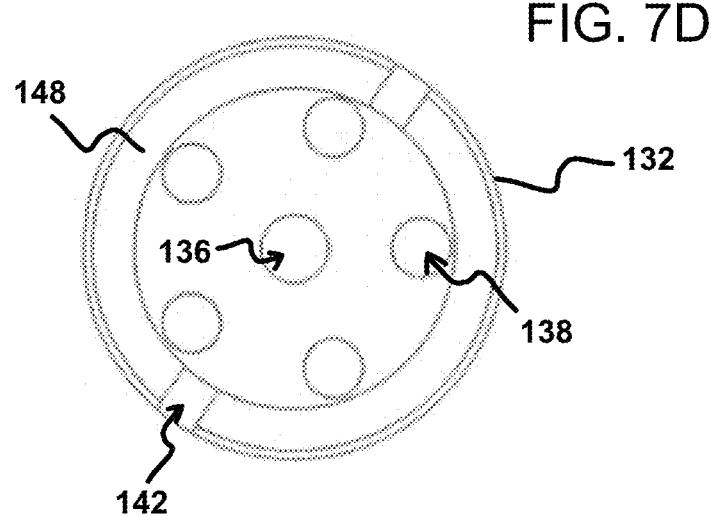
FIG. 7D depicts an orthogonal view from the front of a lower section of a Scent Bullet terminal tackle product according to the preferable embodiments of the present invention depicted in FIGS. 1-6 and 7A-C.
Figure 7E:
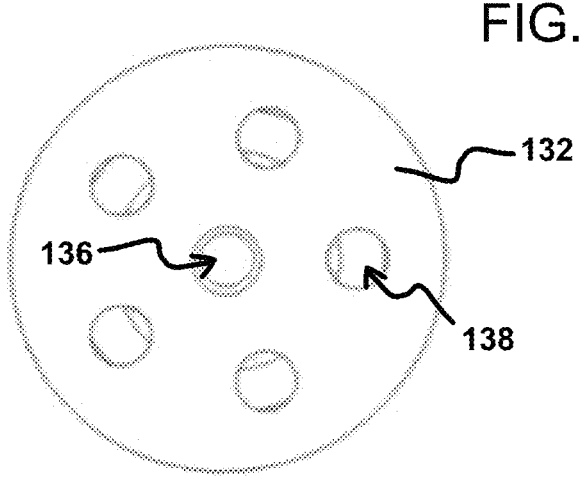
FIG. 7E depicts an orthogonal view from behind of a lower section of a Scent Bullet terminal tackle product according to the preferable embodiments of the present invention depicted in FIGS. 1-6 and 7A-D.

The lower section 132 is depicted in FIGS. 7A-E, separated from the upper section 112, which is not shown in FIG. 7. FIG. 7A particularly depicts the expansion slots 142 and the trench 146 of the female connection apparatus 144, and the feed-line aperture 136 and array of 5 release apertures 138 are depicted particularly clearly in FIGS. 7D and 7E, which depict the lower section 132 from above and from below, respectively. Notably, the leading edge 148 of the female connection apparatus 144 is slanted opposite to the tapered transition shelf 128 between the male connection apparatus 122 and the remainder of the upper section 112 so as to form a tight fit together when the upper and lower sections 112, 132 are connected to one another. As those of skill in the art will recognize, the arrangement of features depicted in FIGS. 6-7, while preferable, is only exemplary, and the present invention may be utilized with these or other parts, features, and the like without departing from the teachings of and applications available to the present invention.

Figure 8:
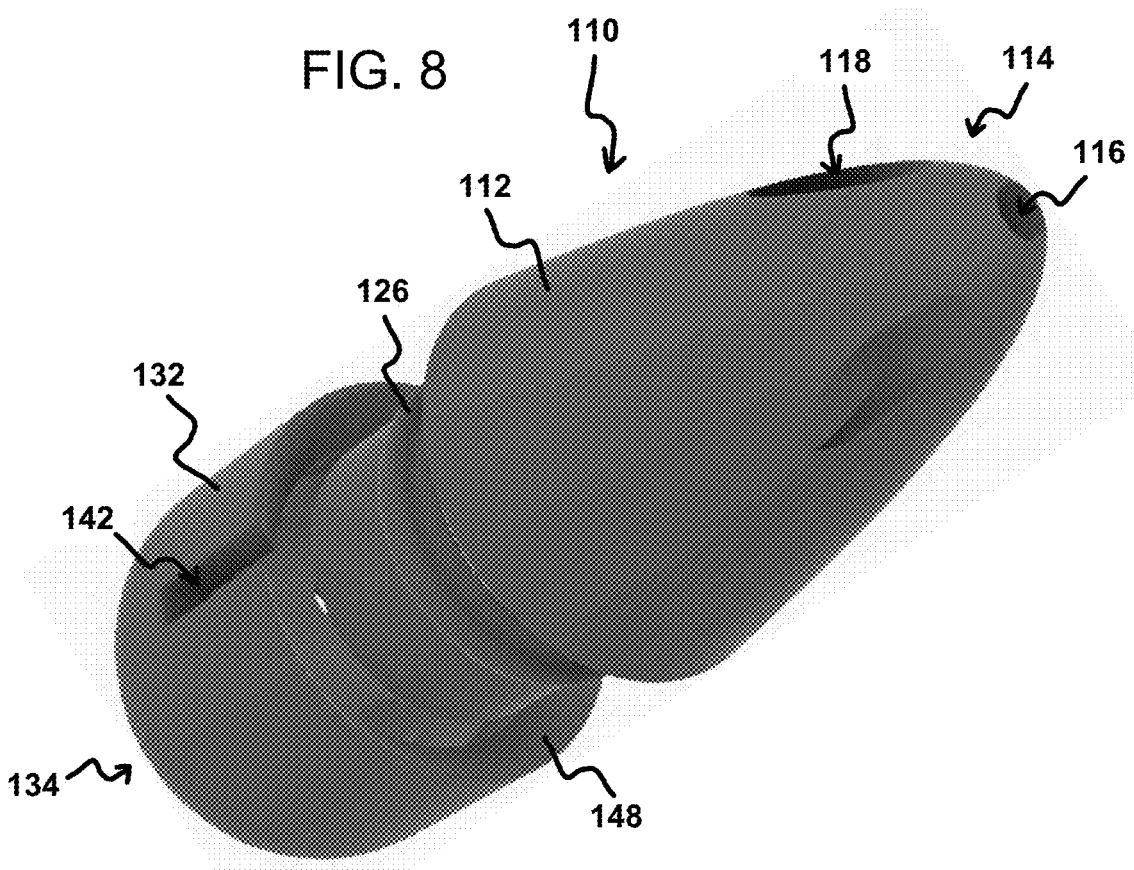
FIG. 8 depicts a perspective view angled from the front of a Scent Bullet terminal tackle product according to the preferable embodiments of the present invention depicted in FIGS. 1-7, wherein the upper and lower sections are separated.

FIG. 8 depicts the Scent Bullet terminal tackle product 110, both upper and lower section 112, 132, in a disconnected state. The male connection apparatus 122 of the upper section 112 has been removed from the female connection apparatus 144 of the lower section 132, and the two sections are aligned for slidable reconnection in FIG. 8's depiction. In use, the fishing line or leader line would be threaded through the feed-line apertures 116, 136 on upper and lower sections 112, 132, helping to align each for reconnection. The user could thus add scent attractant material to either or both of the upper and lower sections' scent chambers 150 and then reconnect the upper and lower sections 112, 132 by biasing them toward one another along the line. Once connected, the scent attractant material would be held within the scent chamber 150, and only small amounts can escape through the various apertures of the present invention, including the one or more release apertures 118, 138 preferably provided on each of the upper and lower sections 112, 132.

Meanwhile, the user may utilize the Scent Bullet terminal tackle product 110 of the present invention to introduce the scent attractant material to the line by sliding it along the line after scent attractant material has been loaded in the scent chamber 150. The user may then position the present invention along the line as desired, using other tackle products such as sinkers and the like, or may allow the present invention to move freely along the line when the line is submerged and in use. Notably, the present invention's design allows it to move freely along the line and rotate freely about the line unless the user specifically decides to restrict that free movement using techniques that will be known and understood to those of skill in the art. These options also make it possible for a user to position the present invention such that it will not be lost if other tackle equipment or bait is lost, accomplishing certain objectives of the present invention.

While the present invention has been described with reference to particular embodiments and arrangements of parts, features, and the like, it is not limited to these embodiments or arrangements. Indeed, modifications and variations will be ascertainable to those of skill in the art, all of which are inferentially and inherently included in these teachings. It is to be understood, therefore, that the invention may be carried out by different equipment and devices than those described herein, and that various modifications, both as to the equipment details and operating procedures, may be accomplished without departing from the spirit and scope of the present invention.

What is claimed is:

1. A terminal fishing tackle apparatus comprising:
    a hollow upper section comprising a chamber for holding scented attractant material, the upper section further comprising an enclosed end and an open end, one or more apertures located at the enclosed end, and a male connection assembly located at the open end;
        the male connection assembly comprising an extension portion, one or more ribs extending outwardly from an outer surface of the extension portion, and a transition shelf connecting the extension portion to the remainder of the upper section;
    a hollow lower section comprising a chamber for holding scented attractant material, the lower section comprising an enclosed bottom and an open end, one or more apertures located at the enclosed bottom, and a female connection assembly located at the open end;
        the female connection assembly comprising an inner surface sized and oriented to snugly receive the extension portion of the male connection assembly, one or more trenches sized and oriented to snugly receive the one or more ribs of the male connection assembly when the extension portion is inserted within the female connection assembly, and a connection surface forming a leading edge of the open end of the lower section, the connection surface abutting the transition shelf of the male connection assembly when fully inserted into the female connection assembly;
    the lower section further comprising one or more slots extending from the leading edge of the open end of the lower portion substantially lengthwise toward the enclosed end to facilitate the expansion of the female connection assembly to receive the male connection assembly when the upper section and lower section are press-fit together and to facilitate the disconnection of the male connection assembly from the female connection assembly when the upper and lower sections are pulled in opposite directions;
    the one or more apertures at the enclosed end of the upper portion and the one or more apertures at the enclosed bottom of the lower portion creating a lengthwise bore extending from end to end of the terminal fishing tackle apparatus through which a line may be threaded to allow the terminal fishing tackle apparatus to move freely there-along; and
    the chamber of the upper portion and the chamber of the lower portion being accessible when the upper and lower portions are disconnected and being substantially enclosed when the upper and lower portions are connected.

2. The terminal fishing tackle apparatus of claim 1, wherein the upper section and the lower section each comprises a substantially cylindrical shape and the enclosed bottom of the lower section tapers toward a distal edge and the enclosed end of the upper section tapers substantially to a distal point.

3. The terminal fishing tackle apparatus of claim 2, wherein:
    the one or more apertures at the enclosed end of the upper section comprise a feed-line aperture located substantially at the distal point of the enclosed end of the upper section and one or more scent-release apertures arrayed substantially uniformly around said feed-line aperture; and
    the one or more apertures at the enclosed bottom of the lower section comprise a feed-line aperture located substantially centrally on the distal edge of the enclosed bottom of the lower section and one or more scent-release apertures arrayed substantially uniformly around said feed-line aperture.

4. The terminal fishing tackle apparatus of claim 1, wherein the transition shelf of the male connection assembly is tapered and the connection surface of the female connection apparatus is likewise tapered such that the transition shelf substantially abuts the connection surface when the male connection assembly is fully inserted within the female connection assembly.

5. A terminal fishing tackle apparatus comprising:
    an upper section comprising a chamber substantially enclosed on all sides but that adjacent to an upper section connection end;
    a lower section comprising a chamber substantially enclosed on all sides but that adjacent to a lower section connection end; and
    one or more connection features facilitating the press-fit connection of the upper section to the lower section and facilitating the disconnection of the upper section from the lower section by pulling the upper and lower sections in opposite directions;
    whereby a substantially enclosed chamber is formed within the terminal fishing tackle apparatus and whereby an aperture is provided at each end of the terminal fishing tackle apparatus creating a lengthwise bore comprising the enclosed chamber and extending from end to end through which a line may be threaded to allow the terminal fishing tackle apparatus to move freely there-along.

6. The terminal fishing tackle apparatus of claim 5, wherein the upper section and the lower section each comprises a substantially cylindrical shape.

7. The terminal fishing tackle apparatus of claim 5, wherein:
the lower section comprises an open end and an enclosed bottom opposite the open end, the enclosed bottom comprising a lower distal edge; and
the upper section comprises an open end and an enclosed end opposite the open end, the enclosed end comprising an upper distal edge.

8. The terminal fishing tackle apparatus of claim 7, wherein the upper section is tapered along its length forming a substantially distal point at the upper distal edge and the enclosed bottom of the lower section is tapered to the lower distal edge.

9. The terminal fishing tackle apparatus of claim 8, further comprising one or more upper section apertures provided at or near the distal point of the upper distal edge and one or more lower section apertures centrally located on the lower distal edge.

10. The terminal fishing tackle apparatus of claim 9, wherein the one or more upper section apertures comprises an upper section feed-line aperture located substantially at the distal point of the upper distal edge of the upper section and the one or more lower section apertures comprises a lower section feed-line aperture located substantially at the center of the lower distal edge of the lower section.

11. The terminal fishing tackle apparatus of claim 10, wherein the one or more upper section apertures further comprises one or more upper section scent-release apertures arrayed substantially uniformly around the upper section feed-line aperture and the one or more lower section apertures further comprises one or more lower section scent-release apertures arrayed substantially uniformly around the lower section feed-line aperture.

12. The terminal fishing tackle apparatus of claim 5, further comprising a male connection assembly and a female connection assembly, the male connection assembly being provided on one of the upper section or the lower section and the female connection assembly being provided on the other one of the upper section or the lower section.

13. The terminal fishing tackle apparatus of claim 12, wherein the male connection assembly comprises an extension portion, one or more ribs extending outwardly from an outer surface of the extension portion, and a transition shelf connecting the extension portion to the remainder of the associated upper or lower section.

14. The terminal fishing tackle apparatus of claim 13, wherein the female connection assembly comprises an inner surface sized and oriented to snugly receive the extension portion of the male connection assembly, one or more trenches sized and oriented to snugly receive the one or more ribs of the male connection assembly when the extension portion is inserted within the female connection assembly, and a connection surface abutting the transition shelf of the male connection assembly when the male connection assembly is fully inserted into the female connection assembly.

15. The terminal fishing tackle apparatus of claim 14, wherein the connection surface of the female connection assembly forms a leading edge of the associated upper or lower section connection end.

16. The terminal fishing tackle apparatus of claim 15, wherein the female connection assembly further comprises one or more slots to facilitate the expansion of the female connection assembly to receive the male connection assembly when the upper section and lower section are press-fit together and to facilitate the disconnection of the male connection assembly from the female connection assembly when the upper and lower sections are pulled in opposite directions.

17. The terminal fishing tackle apparatus of claim 16, wherein the male and female connection assemblies each comprise a substantially cylindrical shape.

18. The terminal fishing tackle apparatus of claim 16, wherein the transition shelf of the male connection assembly is provided at an angle relative to the extension portion of the male connection assembly and the connection surface of the female connection assembly is provided at an angle relative to the inner surface such that the transition shelf and the connection surface abut forming a substantially sealed connection.

19. A terminal fishing tackle apparatus comprising:
a hollow upper section comprising a chamber substantially enclosed on all sides but that adjacent to an upper section connection end and comprising one or more apertures substantially centrally located on an upper section distal edge opposite the upper section connection end;
a hollow lower section comprising a chamber substantially enclosed on all sides but that adjacent to a lower section connection end and comprising one or more apertures substantially centrally located on a lower section distal edge opposite the upper section connection end;
a male connection assembly male connection assembly provided on one of the upper section or the lower section, the male connection assembly comprising an extension portion, one or more ribs extending outwardly from an outer surface of the extension portion, and a transition shelf connecting the extension portion to the remainder of the associated upper or lower section; and
a female connection assembly provided on the one of the upper section or the lower section that does not comprise the male connection assembly, the female connection assembly comprising an inner surface sized and oriented to snugly receive the extension portion of the male connection assembly, one or more trenches sized and oriented to snugly receive the one or more ribs of the male connection assembly when the extension portion is inserted within the female connection assembly, and a connection surface abutting the transition shelf of the male connection assembly when the male connection assembly is fully inserted into the female connection assembly;
wherein the male and female connection assemblies facilitate a press-fit connection of the upper section to the lower section and facilitate the disconnection of the upper section from the lower section by pulling the upper and lower sections in opposite directions; and
whereby a substantially enclosed chamber is formed when the upper and lower sections are connected and whereby the enclosed chamber and the one or more apertures provided at each of the upper section distal edge and the lower section distal edge form a continuous, lengthwise bore from end to end of the terminal fishing tackle apparatus through which a line may be threaded to allow the terminal fishing tackle apparatus to move freely there-along.

20. The terminal fishing tackle apparatus of claim 19, wherein:
- the upper section is tapered along its length forming a substantially distal point at the upper distal edge;
- the lower section is tapered adjacent to the lower distal edge;
- the one or more apertures located on the upper section distal edge comprise an upper section feed-line aperture located substantially at the distal point of the upper distal edge and one or more upper section scent-release apertures arrayed substantially uniformly around the upper section feed-line aperture; and
- the one or more apertures located on the lower section distal edge comprise a lower section feed-line aperture located substantially at the center of the lower distal edge and one or more lower section scent-release apertures arrayed substantially uniformly around the lower section feed-line aperture.

* * * * *